F. A. HILL.
Grain-Drill.
No. 60,189. Patented Dec. 4, 1866.
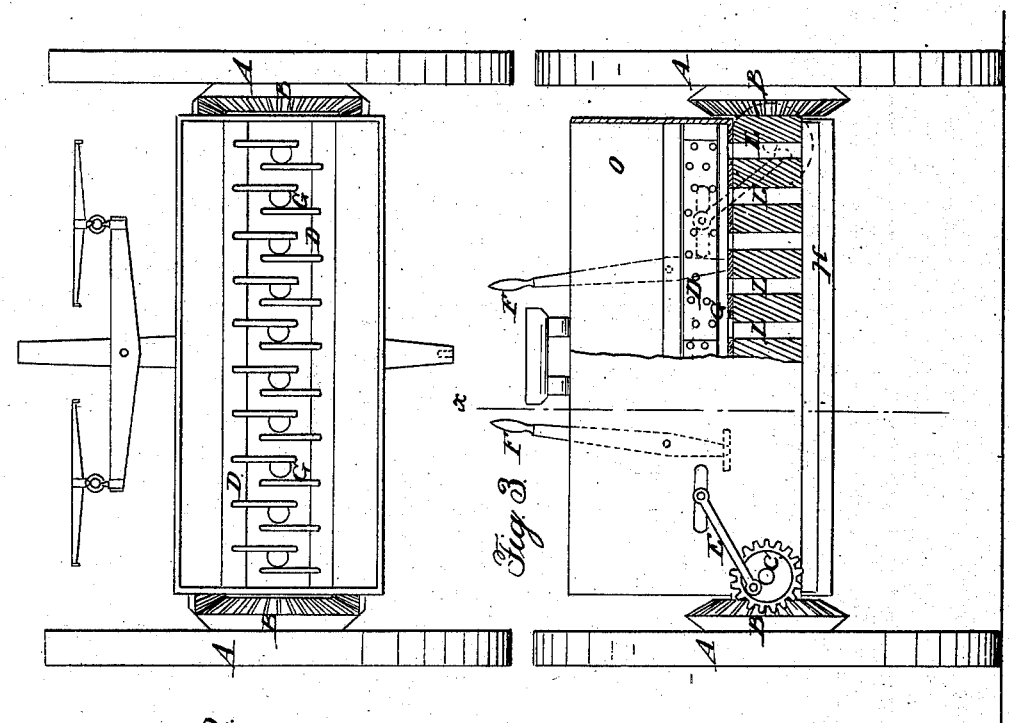
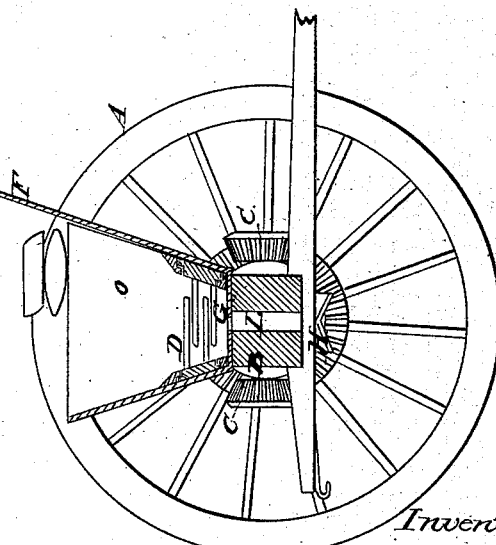
Witnesses.
C. W. M. Smith
Geo. H. Strong
Inventor
Frank A. Hill
By his attys Dewey & Co

United States Patent Office.

IMPROVEMENT IN SEEDING MACHINES.

FRANK A. HILL, OF MARYSVILLE, CALIFORNIA.

Letters Patent No. 60,189, dated December 4, 1866.

SPECIFICATION.

TO ALL WHOM IT MAY CONCERN:

Be it known that I, FRANK A. HILL, of Marysville, Yuba county, State of California, have invented certain new and useful Improvements in Seed Sowers; and I do hereby declare the following description and accompanying drawings are sufficient to enable any person skilled in the art or science to which it most nearly appertains to make and use my said invention, without further invention or experiment.

The nature of my invention relates to an improved device for sowing cereals, and consists of an incline box or bin mounted upon wheels, to which is attached bevelled gearing, connected to stirrers or agitators placed in the bottom of the bin, which causes the grain or seed to fall through the holes upon an angular scatter-board, which spreads the seed evenly over the field. Referring to the drawings—

Figure 1 represents a side sectional elevation of my machine.
Figure 2, a plan.
Figure 3 is an elevation, with a portion of the box or bin removed.

A A, etc., are the driving-wheels, to each end of the axles of which are attached the bevelled wheels, B B, in which the bevelled pinions, C C, work, driving the agitators forward and back. The agitators, D D, are double sets of pins, one set operating alternately in the other at right angles with the seed box, O, near the bottom, by means of connecting rods E E, attached to them and the bevelled pinions. G G are the valves through which the seed falls, and may be opened or closed and regulated to the size of the seed by the levers F F, placed in the side of the seed box upon each side of the driver's seat. L L, etc., are discharge holes, through which the seed falls on to the scatter-board, H.

The operation of my machine is as follows: The seed is put in the box, O, and when the sower is drawn either way, onward or backward, the bevelled wheels, B B and C, will communicate motion to the agitators, D D, which, being in motion, will prevent the holes, L, from filling up and clogging, and thereby the seed will fall with greater facility on the scatter-board, H. The peculiar shape of the scatter-board will spread the seed with great regularity, and a field can be seeded with great evenness and ease, as any person who can drive a team can manage my sower, and seed more acres with grain, than by any other machine now in use, in the same space of time.

Having thus described my improved seed sower, what I claim, and desire to secure by Letters Patent, is—

The agitators D D, in combination with the bevelled gearing B and C, and connecting rods E E, substantially as described and for the purpose set forth.

In witness whereof I have hereunto set my hand and seal.

FRANK A. HILL. [L. S.]

Witnesses:
   E. P. PALMER,
   CHAS. M. GORHAM.